United States Patent

[15] 3,636,527
[45] Jan. 18, 1972

Zuk

[54] STORAGE CIRCUIT

[72] Inventor: Borys Zuk, Somerville, N.J.
[73] Assignee: RCA Corporation
[22] Filed: Aug. 21, 1970
[21] Appl. No.: 65,947

[52] U.S. Cl. ....................340/173 FF, 307/238
[51] Int. Cl. ....................G11c 11/40
[58] Field of Search ....................340/173 FF; 307/238

[56] References Cited

UNITED STATES PATENTS 3,548,386 12/1970 Bidwell ....................340/173

*Primary Examiner*—Terrell W. Fears
*Attorney*—H. Christoffersen

[57] ABSTRACT

A first circuit which includes a flip-flop driven by a clock pulse source and a second circuit which includes a flip-flop coupled to the first circuit by diodes. In response to a clock pulse, the first circuit flip-flop is disabled, the diodes decouple the second circuit flip-flop from the first circuit, and a data bit signal manifestation applied to the first circuit causes a voltage condition to be established there indicative of the value of the bit. Upon termination of the clock pulse, the two flip-flops assume stable states dependent on the value of the data bit.

9 Claims, 3 Drawing Figures

INVENTOR.
Borys Zuk
BY
Henry Schanzer
ATTORNEY

INVENTOR.
Borys Zuk
BY
Henry Schanzer
ATTORNEY

STORAGE CIRCUIT

SUMMARY OF THE INVENTION

First and second two-element element storage circuits and a clock-pulse source coupled to one storage circuit for driving it between a first condition in which both elements are in the same state and a second condition in which both elements are in different states. A data bit signal source is coupled to the first circuit. Means responsive to a signal manifestation produced by the data bit signal source when the first storage circuit is in its first condition decouples the two storage circuits and establishes in the first storage circuit a tendency to assume a given state in its second condition. Means responsive to the signal manifestation when the first storage circuit is changing to its second condition, causes the latter to assume said given state and transfers from the first storage circuit to the second the information stored in said first storage circuit.

DETAILED DESCRIPTION

Figure 1:
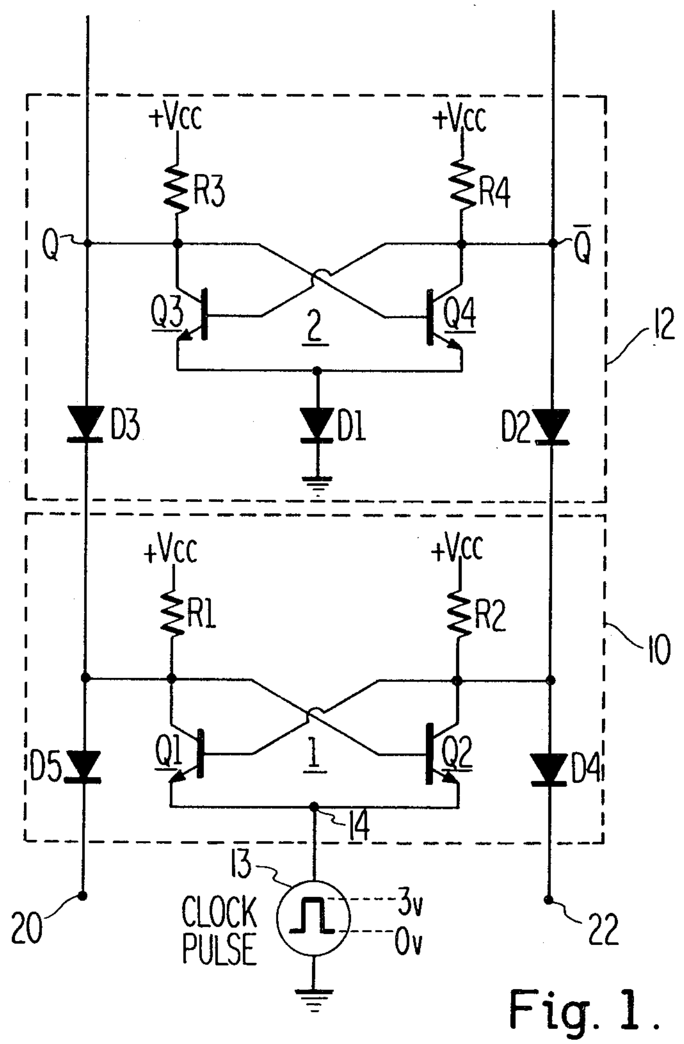
FIG. 1 is a schematic diagram of a preferred embodiment of the invention.

The storage circuit of FIG. 1, includes gating circuit 10, comprising coupling diodes (D4, D5) and a first cross-coupled flip-flop, 1, (Q1, Q2) and a second circuit 12 comprising coupling diodes (D2, D3) and a second cross-coupled flip-flop, 2, (Q3, Q4).

In gating circuit 10, transistors Q1 and Q2 have their emitters connected to terminal 14 which is adapted to receive a clock signal from clock-pulse generator 13. The collector of transistor Q1 is directly connected to the base of transistor Q2, to the anode of diode D5, to the cathode of diode D3, and through resistor R1 to a source of operating potential $V_{cc}$ such as +5 volts. The collector of transistor Q2 is directly connected to the base of transistor Q1, the anode of diode D4, the cathode of diode D2 and through resistor R2 to a source of operating potential $V_{cc}$. The cathodes of diodes D5 and D4 are connected to signal input terminals 20 and 22, respectively. The signal applied to terminal 22 is the complement of the signal applied to terminal 20.

The second circuit 12 includes transistors Q3 and Q4 the emitters of which are connected to the anode of diode D1 whose cathode is connected to ground potential. The collector of transistor Q3 is directly connected to the base of transistor Q4, the anode of diode D3 and through resistor R3 to $V_{cc}$. The collector of transistor Q4 is directly connected to the base of transistor Q3, the anode of diode D3 and through resistor R4 to $V_{cc}$. The signals produced at the collectors of transistors Q3 and Q4 (Q, $\overline{Q}$) are the outputs of the stage and are complementary to each other.

In the operation of the circuit of FIG. 1, when the clock pulse is +3 volts, or more, the input information applied at terminals 20 and 22 is transferred into the first flip-flop, 1, and when the clock pulse is approximately 0 volts, the information present in flip-flop, 1, is transferred to the second flip-flop, 2. The signals applied to terminals 20 and 22 may be the outputs (Dout and $\overline{\text{D}}$out) of a circuit such as the one shown in FIG. 2 and/or, as shown in FIG. 3, may be the outputs (Q and $\overline{Q}$) of the second flip-flop 2 of a storage circuit similar to the one shown in FIG. 1. The voltage present at an output terminal such as Q or $\overline{Q}$ of the second flip-flop, when that signal is in the "high" state, is equal to the base-to-emitter diode drop ($V_{BE}$) of transistor Q3 and Q4 in series with the forward diode drop of diode D1. It may be assumed, for example, that $V_F$, the voltage drop across the diode, D1, is equal to $V_{BE}$ and that both are equal to 0.75 volt ($V_{HIGH}$=2×$V_{BE}$). A "high" signal may thus typically be in the order of 1.5 volts.

The voltage present at an output terminal of flip-flop, 2, when the signal present there is in the "low" state is equal to the collector-to-emitter saturation voltage ($V_{CESAT}$) of the "on" transistor in series with the $V_F$ of diode D1; ($V_{LOW}$=$V_{BE}$ +$V_{CESAT}$). Assuming, for example, that $V_{CESAT}$ is 0.25 volts, a "low" signal at one of the two outputs of the second flip-flop is equal to 1.0 volt.

To illustrate the operation of the circuit, assume that Q is "low" ($\overline{Q}$ is high) and that with the clock signal at +3 volts or more a "high" signal (+1.5 volts) is applied to terminal 20 and correspondingly a "low" signal (+1.0 volt) is applied to terminal 22. Under this clock signal condition (+3 volts), transistors Q1 and Q2 are nonconducting. The "high" signal (2× $V_{BE}$) applied to terminal 20 is sufficiently lower than $V_{cc}$ that current flows through diode D5. The voltage drop of diode D5 (which is also assumed to be approximately equal to $V_{BE}$) causes the potential at the cathode of diode D3 to equal 3$V_{BE}$ (=2.25 volts). Since the maximum potential at Q cannot exceed 2$V_{BE}$ ($V_{BE}$ of Q4 plus $V_F$ of D1), diode D3 is reverse biased and does not couple the input signal present at 20 to the flip-flop, 2. Similarly, the "low" signal ($V_{BE}$+$V_{CESAT}$=+1.0 volt) applied to terminal 22 causes diode D4 to conduct and its voltage causes the potential at the cathode of diode D2 to equal 2$V_{BE}$+$V_{CESAT}$ (1.75 volts). As $\overline{Q}$ is high (1.5 volts), diode D2 is nonconducting and the input signal present at 22 is not coupled to the second flip-flop, 2.

Note that the potential (3$V_{BE}$) at the cathode of diode D3 is the potential applied to the base of transistor Q2 and that the potential (2$V_{BE}$+$V_{CESAT}$) at the cathode of diode D2 is the potential applied to the base of transistor Q1.

When the clock pulse returns to ground (zero volts) the transistor of flip-flop 1 with the higher base voltage conducts first, keeping the other transistor off. In the present example, the base of Q1 is at +1.75 volts and the base of Q2 is at +2.25 volts. Transistor Q2 therefore is driven into conduction and it is supplied sufficient base drive to saturate and to cut off transistor Q1. With the clock pulse at zero volts (and neglecting any source impedance associated with clock-pulse generator 12) the potential at the collector of Q2 is now $V_{CESAT}$ while the potential at the collector of Q1 is now equal to the $V_{BE}$ of transistor Q2.

With the collector of transistor Q2 at $V_{CESAT}$(0.25 volt) current flows from +$V_{cc}$ through resistor R4, diode D2 and the collector-to-emitter path of transistor Q2 to ground. Note that diode D2 in series with the collector-to-emitter path of transistor Q2 clamps the potential at $\overline{Q}$ to the "low" value ($V_{BE}$+$V_{CESAT}$=+1.0 volt). Meanwhile, while diode D3 is forward biased, the extent of such bias is only +0.75 volt [the potential at its cathode is equal to $V_{BE}$ (0.75 volt) and the potential at its anode is a maximum of 2$V_{BE}$ (+1.5 volts)], so that it does not conduct appreciable current since its threshold is barely reached. The potential at Q which was originally assumed to be low is now switched to high and the potential at $\overline{Q}$ which was originally assumed to be high is switched to low.

It has thus been shown that when the clock pulse is high, data signals present at 20 and 21 cause a voltage condition to be established at the first flip-flop indicative of the value of these signals (indicative of whether they represent a 1 or a 0) and the second flip-flop 2 is decoupled from these signals. It has also been shown that when the clock pulse goes low, the flip-flop 1 of the gating circuit 10 assumes a stable state indicative of the value of the input signals and the flip-flop 2 of the second circuit becomes coupled to the first flip-flop and also assumes a stable state indicative of the value of the data signals.

Figure 2:
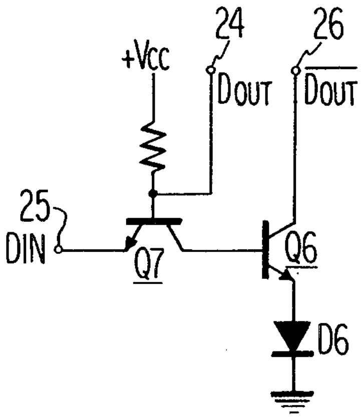
FIG. 2 is a schematic diagram of a phase inverter according to the invention which is useful with the circuit of FIG. 1.
Figure 3:
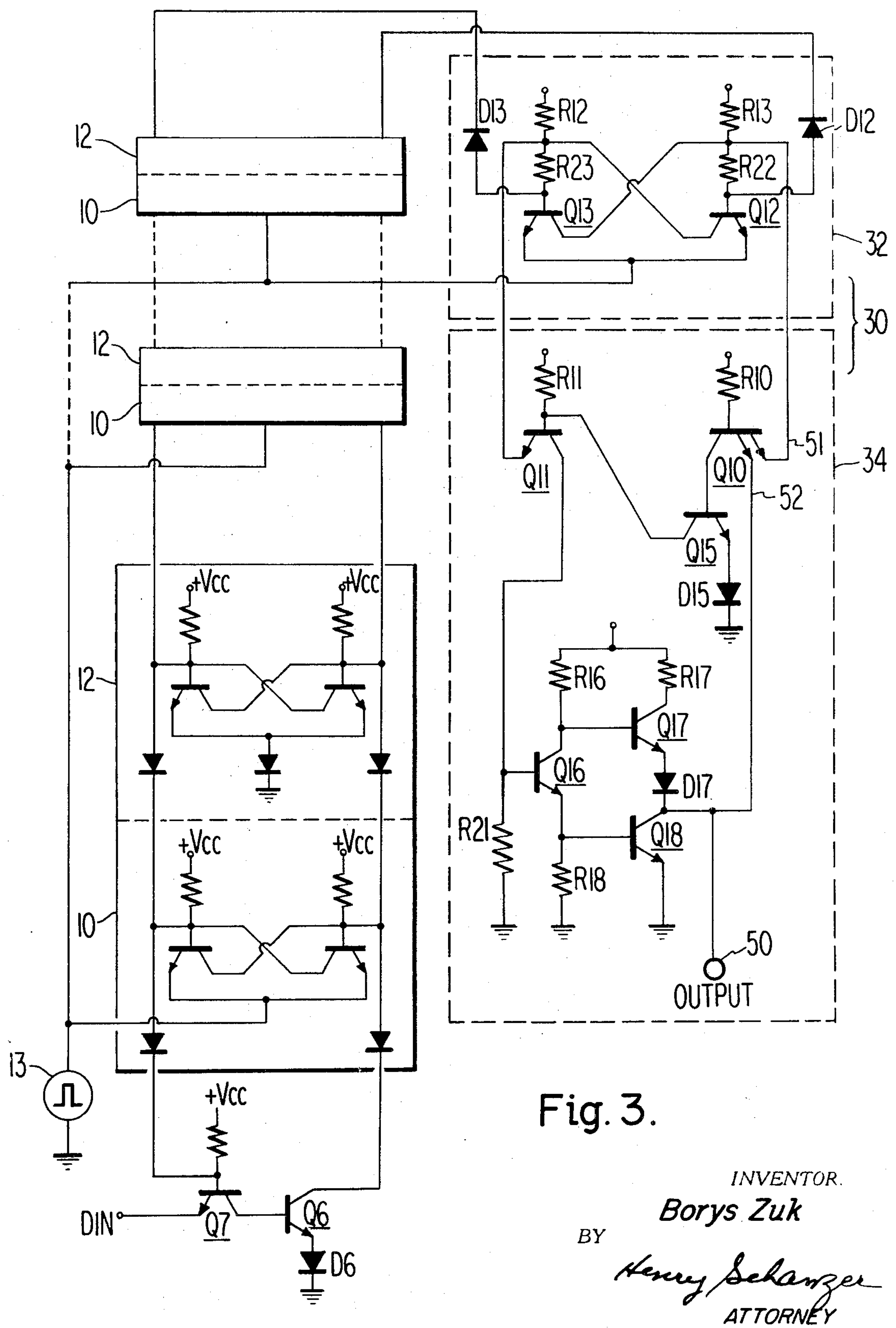
FIG. 3 is a block and schematic circuit diagram of a portion of a shift register embodying the invention.

FIG. 2 shows a level shift and phase-splitting network which is adapted to receive at terminal 25 a signal ($D_{IN}$) from an external signal source (not shown) and which produces in response thereto an inphase signal ($D_{OUT}$) at terminal 24 and an out-of-phase signal, $\overline{D_{OUT}}$, (the complement of $D_{OUT}$) at terminal 26. The signals generated at terminals 24 and 26 may be coupled to input terminals 20 and 22 of FIG. 1 to provide the data signals to the storage circuit. When $D_{IN}$ is more positive than the sum of the diode drops of the base-to-collector of transistor Q7 ($V_{CB}$), plus the $V_{BE}$ of transistor Q6 and the $V_F$ of diode D6 the emitter-to-base region of transistor Q7 is reverse biased. The potential at terminal 24 is then equal to $V_{CB}+V_{BE}+V_F$ which is an equivalent "high" signal and the potential at terminal 26 is equal to the $V_{CE\,SAT}$ of transistor Q6 plus the $V_F$ of diode D6 which is a "low" signal. When $D_{IN}$ is at, or near ground potential, the potential at terminal 24 is at approximately $V_{BE}$ volts above ground potential which may be considered a low signal and transistor Q6 is rendered nonconducting so that it does not load or lower the potential of the point to which it is connected which is therefore an equivalent "high" signal.

The output signals (Q, $\overline{Q}$) generated by the circuit of FIG. 1 may be directly coupled to other stages as shown in FIG. 3 or to a differential stage (not shown) which could be part of external circuitry. Alternatively, to drive external logic circuits, such as the well known diode-transistor logic (DTL) or transistor-transistor logic (TTL), the output signals (Q and $\overline{Q}$) may be level shifted to vary between ground level and $V_{cc}$ as shown in FIG. 3.

FIG. 3 shows how the storage circuits of FIG. 1 may be serially connected to operate as a shift register. The circuit of FIG. 2 may be used to drive the first stage of the shift register. FIG. 3 also shows an output circuit 30 which in response to internally generated signals (Q and $\overline{Q}$) provides a buffered output signal which is capable of driving external circuitry. The output circuit 30 comprises a first section 32 which operates in the same manner as the gate circuit 10 but has different values of resistors in order to generate, when necessary, a "high" output at the collector of transistors Q12 and Q13 which is considerably higher than the high output ($2V_{BE}$) of the remainder of the stages. The second section 34 of output circuit 30 includes buffering circuit which also takes the "low" signal ($V_{BE}+V_{CE\,SAT}$) and produces instead a "low" signal at output terminal 50 which is equal to the $V_{CE\,SAT}$ of transistor Q18.

Assume that the collector potential of transistor Q12 is high and that the collector potential of transistor Q13 is low. Under this condition, the base-to-emitter region of transistor Q11 is reverse biased, but, current flows through resistor R11, the base-to-collector diode of transistor Q11, and into the base of transistor Q16. Transistor Q16 amplifies its base drive and drives transistor Q18 very hard such that transistor Q18 is saturated and clamps terminal 50 to ground through its collector-to-emitter path. Note also that transistor Q10 with a low applied to one of its emitter electrodes maintains transistor Q15 in the cutoff condition.

Assume now that the collector potential of transistor Q12 is "low" and that the collector potential of transistor Q13 is "high". Transistor Q11 is forward biased and acts to cut off transistor Q16.

Since transistor Q16 is cut off no further base drive is provided to transistor Q18 which then turns off and which is maintained off by base return resistor R18. With transistor Q16 nonconducting current flows from $V_{cc}$ through resistor R16 into the base of emitter-follower transistor Q17 which conducts an amplified current through diode D17 to produce a "high" output level at output terminal 50. The "high" output level is approximately equal to $+V_{cc}$ minus the sum of the base-to-emitter drop of transistor Q17 and the forward drop $V_F$ of diode 17 ($V_{cc}-V_{BE}-V_F$). For an assumed value of $V_{cc}$ equal to 5 volts the high output level is approximately 3.5 volts.

The "high" output at terminal 50 combined with the "high" collector potential of transistor Q13 reverse biases both emitter-to-base junctions of transistor Q10. This causes current to flow through resistor R10, the base-to-collector of transistor Q10 and into the base of transistor Q15. The base drive into transistor Q15 is sufficient to cause it to saturate which causes it to clamp the base potential of transistor Q11 to value of potential equal to the $V_{CE\,SAT}$ of transistor Q15 plus the $V_F$ of diode D15. Transistor Q11 is cut off and since it provides no base drive to transistor Q16, the latter and transistor Q18 remain cut off completing the loop. The output stage 34 thus operates as a bistable stage whose output has two stages, one state is a "low" level which is approximately ground potential and the other state is a "high" level which is close to $+V_{cc}$.

What is claimed is:

1. In combination:

first and second two-element storage circuits;

a clock-pulse source coupled to one storage circuit for driving it between a first condition in which both elements are in the same state and a second condition in which both elements are in different states;

a data bit signal source coupled to said first circuit;

means responsive to a signal manifestation produced by said data bit signal source when said first storage circuit is in its first condition for decoupling said two storage circuits and for establishing in said first storage circuit a tendency to assume a given state in its second condition; and means responsive to said signal manifestation when said first storage circuit is changing to its second condition for causing said first storage circuit to assume said given state and for transferring from said first storage circuit to the second the information stored in said first storage circuit.

2. In the combination as set forth in claim 1 each storage circuit comprising a pair of cross-coupled transistors.

3. In the combination as set forth in claim 2 each flip-flop having a one output terminal and a zero output terminal, and further including a pair of unidirectionally conducting elements one coupled between the two one terminals and the other coupled between the two zero terminals, said two unidirectional conducting elements serving to decouple the two storage circuits when said first storage circuit is in its first condition.

4. A counter stage comprising:

first and second bistable circuits, each bistable circuit including a pair of transistors having their emitters connected in common, and having the base and collector of one transistor connected to the collector and base, respectively, of the other transistor for forming first and second input-output points;

first unidirectional coupling means connected between the input-output points of said first bistable circuit and first and second input terminals for supplying a signal input and its complement to said first circuit;

second unidirectional coupling means connected between the input-output points of said first bistable circuit and the input-output points of said second bistable circuits;

a terminal adapted to receive a clock signal connected to the emitters of said first bistable circuit; and biasing means connected to the emitters of said second bistable circuit for raising the potential at the input-output points of said second bistable circuit.

5. The combination as claimed in claim 4 wherein said first and second unidirectional coupling means and said biasing means are diodes.

6. The combination as claimed in claim 5 wherein said biasing means diode is connected in a direction to conduct current in the same direction as the emitter current flowing in the transistors to which it is connected.

7. The combination as claimed in claim 6 wherein said clock signal has a first level for: (a) transferring the signal inputs to said first circuit; (b) rendering both transistors of said first bistable circuit nonconducting; and (c) decoupling said second bistable circuit from said first bistable circuit and, a second level for transferring the signal from said first bistable circuit and storing it in said second bistable circuit and rendering one of said pair of transistors in each bistable circuit conducting.

8. The combination as claimed in claim 7 further including a pair of power terminals for the application therebetween of a source of operating potential and impedance means coupled between one terminal of said pair of power terminals and each one of said input-output points.

9. The combination as claimed in claim 7 further including circuit means coupled to the input-output points of said second bistable circuit; said circuit means being responsive to the signals at said input-output points and having an output terminal for producing a signal thereat which is clamped to one or the other of said pair of power terminals.

* * * * *